US006621935B1

(12) United States Patent
Xin et al.

(10) Patent No.: US 6,621,935 B1
(45) Date of Patent: Sep. 16, 2003

(54) SYSTEM AND METHOD FOR ROBUST IMAGE REPRESENTATION OVER ERROR-PRONE CHANNELS

(75) Inventors: Jun Xin, Beijing (CN); Shipeng Li, Princeton, NJ (US); Ya-Qin Zhang, West Windsor, NJ (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/561,686

(22) Filed: May 1, 2000

Related U.S. Application Data
(60) Provisional application No. 60/169,066, filed on Dec. 3, 1999.

(51) Int. Cl.[7] .................................................. G06K 9/36
(52) U.S. Cl. .................................... 382/253; 375/240.22
(58) Field of Search .................................. 382/232–253; 375/240.22; 348/698

(56) References Cited

U.S. PATENT DOCUMENTS

| | | | | |
|---|---|---|---|---|
| 5,521,988 A | * | 5/1996 | Li et al. ...................... | 382/248 |
| 5,592,569 A | * | 1/1997 | Li et al. ...................... | 382/253 |
| 5,883,981 A | * | 3/1999 | Li et al. ...................... | 382/253 |
| 6,205,256 B1 | * | 3/2001 | Chaddha ..................... | 382/253 |

OTHER PUBLICATIONS

Li et al. "Very low bit rate video coding using vector–based techniques" Proc. International Conference on Image Processing, 1996, vol. 1, p. 645–648, Sep. 1996.*

Cuperman, "Joint bit allocation and dimensions optimization for vector transform quantization" IEEETransactions on Informatio Theory vol. 39, pp. 302–305, Jan. 1993.*

* cited by examiner

*Primary Examiner*—Jingge Wu
(74) *Attorney, Agent, or Firm*—Lee & Hayes, PLLC

(57) ABSTRACT

An image distribution system has a source that encodes digital images and transmits them over an error-prone channel to a destination. The source has an image coder that processes the digital images using vector transformation followed by vector quantization. This produces groups of vectors and quantized values that are representative of the images. The image coder orders the vectors in the codebooks and assigns vector indexes to the vectors such that a bit error occurring at a less significant bit in a vector index results in less distortion than a bit error occurring at a more significant bit. Depending upon the format and the capabilities of the source and destination, the image coder may allocate different numbers of bits to different groups of vectors according to a bit allocation map for this allocation process. The source also has a UEP (Unequal Error Protection) coder that layers the vector indexes according to their significance. Two possible approaches include frequency-based UEP and bit-plane based UEP. The source transmits a bitstream that includes the image values, a bit allocation map, and the layered vector indexes. The destination receives the bitstream and recovers the vectors using the vector indexes and bit allocation map. The destination then reconstructs the image from the image values and the vectors.

42 Claims, 10 Drawing Sheets

STEP 210 (FIG 2): VTQ DECODING

SYSTEM AND METHOD FOR ROBUST IMAGE REPRESENTATION OVER ERROR-PRONE CHANNELS

RELATED APPLICATIONS

This non-provisional utility application claims priority to the provisional application No. 60/169,066 entitled "Robust Image Representation Over Error-Prone Channels," filed Dec. 3, 1999 by Jun Xin, et al., and commonly assigned to the assignee of the present invention.

TECHNICAL FIELD

This invention relates to systems and methods for coding digital images for transmission over error-prone communication channels.

BACKGROUND

Communication has traditionally been carried out over very reliable networks, such as phone lines and fiber optics. With the exploding popularity of newer mediums, such as the Internet and wireless networks (e.g., satellite, cellular, etc.), an increasingly larger percentage of communication is being conducted over more non-traditional networks. The newer networks offer numerous advantages over their traditional counterparts. Unfortunately, reliability is not necessarily one of them. In comparison to the older communication channels, some of the newer forms of communications channels are prone to errors.

Delivering multimedia content over error-prone networks, such as the Internet and wireless networks, presents difficult challenges in terms of both efficiency and reliability. Digital images and video pose a particular problem because they often represent the largest percentage or most significant portion of the multimedia content.

Traditionally, images being transmitted over error-prone channels were first compressed using variable length coding (VLC). For example, JPEG and MPEG both use variable length coding. Unfortunately, one characteristic of variable length coding is that it is very sensitive to errors. A single bit error usually results in loss of synchronization and contents between the previous and next synchronization codewords are usually discarded. Also, once an error is introduced into the bitstream at the receiver, it is difficult to recover the entire image. In error-prone channels, errors are likely to occur and thus variable length coding is not a suitable coding technique.

One prior art solution to coding images in a manner that is less sensitive to errors is to use vector quantization (VQ). Vector quantization is a fixed length coding scheme that, unlike the popular VLC scheme, limits bit errors within a codeword such that no error propagation takes place. Thus, VQ is a more preferred coding technique than VLC.

A separate problem concerning communication over error-prone channels is the ability to ensure delivery of at least the most important parts of a transmission. That is, different parts of any given bitstream are more important than other parts. In the video context, for example, lower frequency components are considered to be more important than higher frequency components. Important components deserve higher protection over an error-prone channel to ensure proper delivery.

To address the coding efficiency, another prior art coding scheme uses a fixed-length coding. The coding scheme is based on vector transformation (VT) and vector quantization (VQ), and is sometimes short-handedly referred to as "VTQ". VTQ outperforms scalar transform and scalar quantization in coding efficiency. The fundamental reason is that the vector transform reduces inter vector correlation while preserving intra vector correlation in a better manner than scalar transform. With this property, the efficiency of vector quantization is significantly improved.

The VTQ coding scheme is described in more detail in Weiping Li and Ya-Qin Zhang, "Vector-Based Signal Processing and Quantization for Image and Video Compression", Proceedings of the IEEE, Vol. 83, No. 2, February 1995, and in Weiping Li and Ya-Qin Zhang, "New insights and results on transform domain VQ of images," in Proc. IEEE Conf. Acoustics, Speech, and Signal Processing, Minneapolis, Minn., April 1993, pp. V607–V612.

The coding scheme described below is an improvement of the Li and Zhang coding scheme.

SUMMARY

An image distribution system has a source that encodes digital images and transmits them over an error-prone channel to a destination. The source has an image coder that processes the digital images using vector transformation followed by vector quantization (i.e., VTQ processing). The VTQ processing produces groups of vectors and quantized values that are representative of the images. The image coder orders the vectors and assigns vector indexes to the vectors such that a bit error occurring at a less significant bit in a vector index results in less distortion than a bit error occurring at a more significant bit.

Depending upon the format and the capabilities of the source and destination, the image coder may allocate different numbers of bits to different groups of vectors to achieve the best quality given a fixed number of total bits. For example, DC vectors are allocated comparatively more bits, low frequency vectors are allocated the next highest number of bits, and so forth. The image coder relies on an optimized bit allocation map for this allocation process.

The source also has a UEP (Unequal Error Protection) coder that layers the vector indexes according to their significance. Two possible approaches include frequency-based UEP and bit-plane based UEP. With frequency-based UEP, the UEP coder deems the DC vector and lower frequency vectors as more important and thus protects them at the expense of higher frequency vectors. With bit-plane based UEP, the bits forming the vector indexes are layered in planes and the planes encompassing the more significant bits are deemed of higher importance in comparison to other planes, and hence receive greater protection.

The UEP coder may also assign channel codes to each of the layers. In one implementation, the UEP coder assigns Rate Compatible Punctured Convolution (RCPC) channel codes with different code rates to protect the various layers.

The source outputs a bitstream that includes the image values, the bit allocation map, and the layered vector indexes. The source transmits the bitstream over the communication channel to the destination.

The destination receives the bitstream and is equipped with a decoder to decode the bitstream. The decoder recovers the vectors using the vector indexes and bit allocation map and reconstructs the image from the image values and the vectors.

BRIEF DESCRIPTION OF THE DRAWINGS

The same numbers are used throughout the drawings to reference like elements and features.

DETAILED DESCRIPTION

This disclosure describes a coding scheme for coding digital images for transmission over error-prone networks, such as the Internet and wireless networks. The digital images may be still images (e.g., photographs, drawings, etc.), frames from video, or the like. The coding scheme may be implemented in many different environments. One exemplary implementation is described below.

Exemplary Architecture

Figure 1:
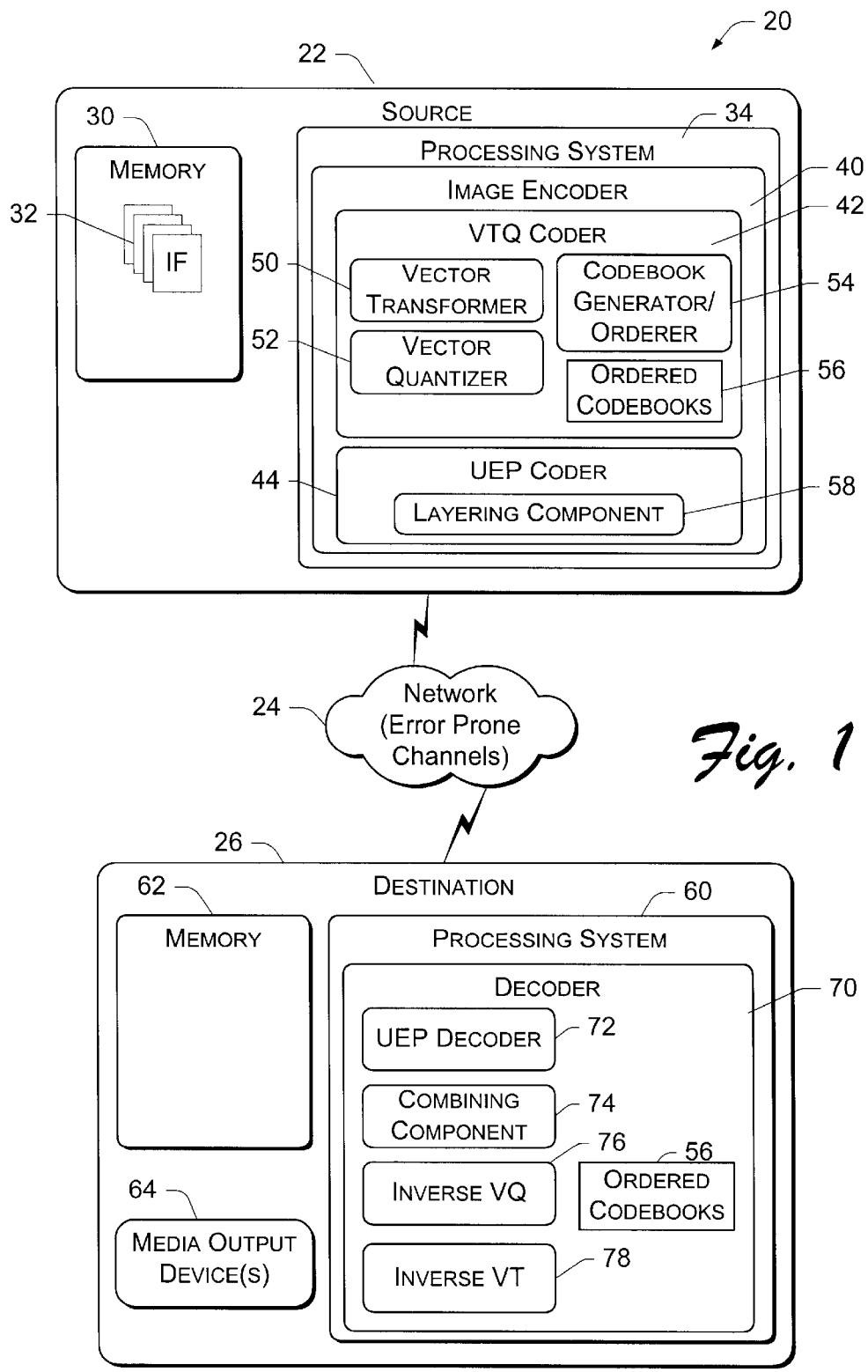
FIG. 1 is a block diagram of an image distribution system in which a source encodes a digital image and transfers the image over an error-prone channel to a destination.

FIG. 1 shows an image distribution system 20 in which a source 22 stores and distributes digital images (e.g., still images, video frames, etc.) over a network 24 to a destination 26. The network is representative of many diverse types of networks, including the Internet and wireless networks (e.g., satellite, cellular, RF, etc.). Communication channels through network 24 are assumed to be inherently prone to error in that packets of data may be lost or adversely modified in route between the source 22 and destination 26, thereby rendering image recovery at the destination 26 difficult or impossible.

The source 22 may be implemented in many ways, including as a network server, an Internet server, a transmitter for wireless communications, and the like. The source 22 has a memory 30 to store digital image files (IF) 32, which may be still images, video data, or some form of multimedia content. The source 22 also has a processing system 34 to encode the digital images and distribute them over the network 24. The processing system 34 has an encoder 40 to code the images. The processing system may also include an operating system (not shown).

The components of encoder 40 are illustrated as functional blocks. The encoder 40 may be implemented in software, firmware, and/or hardware. It may be embodied as a separate standalone module, constructed as part of a processor or integrated circuit chip, or incorporated into an operating system or other application.

The encoder 40 has a VTQ coder 42 and a UEP coder 44. The VTQ coder 42 encodes an image taken from memory 30 (or another source) using a combination of vector-based signal processing and vector-based quantization. "VTQ" is a short-hand acronym meaning a combined image process involving vector transformation (VT) followed by vector quantization (VQ). VTQ enables very robust and efficient coding of the image. The VTQ coder 42 produces quantized image data and vector information that can be encoded into a bitstream for transmission over the network 24 to the destination 26.

The UEP (Unequal Error Protection) coder 44 layers portions of the bitstream into multiple layers in order of their significance in reproducing the image. The UEP coding scheme recognizes that certain parts of the bitstream contain more important information than others, and attempts to make sure that at least the more important parts of the bitstream are properly transmitted to the destination.

The UEP coder 44 also assigns different significance levels to the layers of the coded bitstream. In one implementation, the UEP coder 44 assigns Rate Compatible Punctured Convolution (RCPC) channel codes with different code rates to protect the various layers or portions of the bitstream. RCPC offers UEP to coded bits with different importance in reconstruction and different error sensitivity, without disrupting performance. Another advantage is that a single Viterbi decoder can be used to decode a family of RCPC codes with different rates since all coded bits of a high rate punctured code are embedded into the lower rate codes of the same family. RCPC is well known and is described in more detail in article by Joachim Hagenauer, entitled "Rate-Compatible Punctured Convolutional Codes (RCPC Codes) and their Applications", IEEE Trans. On Comm., Vol.36, No.4, April 1988.

The VTQ coder 42 has a vector transformer 50 and a vector quantizer 52 to process the image. A codebook generator/orderer 54 generates codebooks for the VTQ process. The codebook generator 54 builds multiple ordered codebooks 56 from many diverse training images. In one implementation, the codebook generator employs essentially the same process used in the VTQ process to process the training images.

Each codebook lists multiple vectors that are represented by a corresponding binary index. Without the ordering process, each codebook would contain vectors randomly distributed in the code vector space. The indices would then be assigned to the vectors. With this random arrangement, a one-bit error between the indices may introduce significant error into the coded bitstream.

Accordingly, to minimize this potential for error, the codebook generator/orderer 54 implements an ordering process that organizes the codebook indices in a manner that achieves better error protection. More particularly, the codebook generator/orderer 54 arranges the vectors and assigns corresponding indices in a way that minimizes the distance between sequential neighboring vectors so that any error in the associated indices will not cause significant errors during decoding and recovery of the image.

The UEP coder 44 has a layering component 58 that layers the coded bitstream. More particularly, the layering component 58 layers the vector indexes according to their significance. Two possible approaches include frequency-based UEP and bit-plane based UEP. With frequency-based UEP, the UEP coder deems the DC vector and lower frequency vectors as more important and thus protects them at the expense of higher frequency vectors. With bit-plane based UEP, the bits forming the vector indexes are layered in planes and the planes encompassing the more significant bits are deemed of higher importance in comparison to other planes, and hence receive greater protection. Each layer is then further encoded using a channel code.

The source 22 outputs a UEP encoded bitstream that includes the quantized image values, a bit allocation map used during quantization, and the layered vector indexes. The source 22 transmits the bitstream over the communication channel to the destination 26.

The destination 26 may be embodied in a many different ways, including a computer, a handheld entertainment device, a set-top box, a television, a cellular phone, and so forth. The destination 26 is equipped with a processing system 60, a memory 62, and one or more media output devices 64. The processing system 62 has a decoder 70 and may optionally include an operating system (not shown).

The decoder 70 has a UEP decoder 72 and combining component 74 to separate the layers and recombine the layers into a coded bitstream. When CRC/RCPC is employed, the UEP decoder 72 may be implemented as a Viterbi decoder. The bitstream is passed to an inverse vector quantizer 76 and an inverse vector transformer 78, which reconstruct the image using the vectors indexed via the vector indexes to the ordered codebook 56 and the bit allocation map.

General Operation

Figure 2:
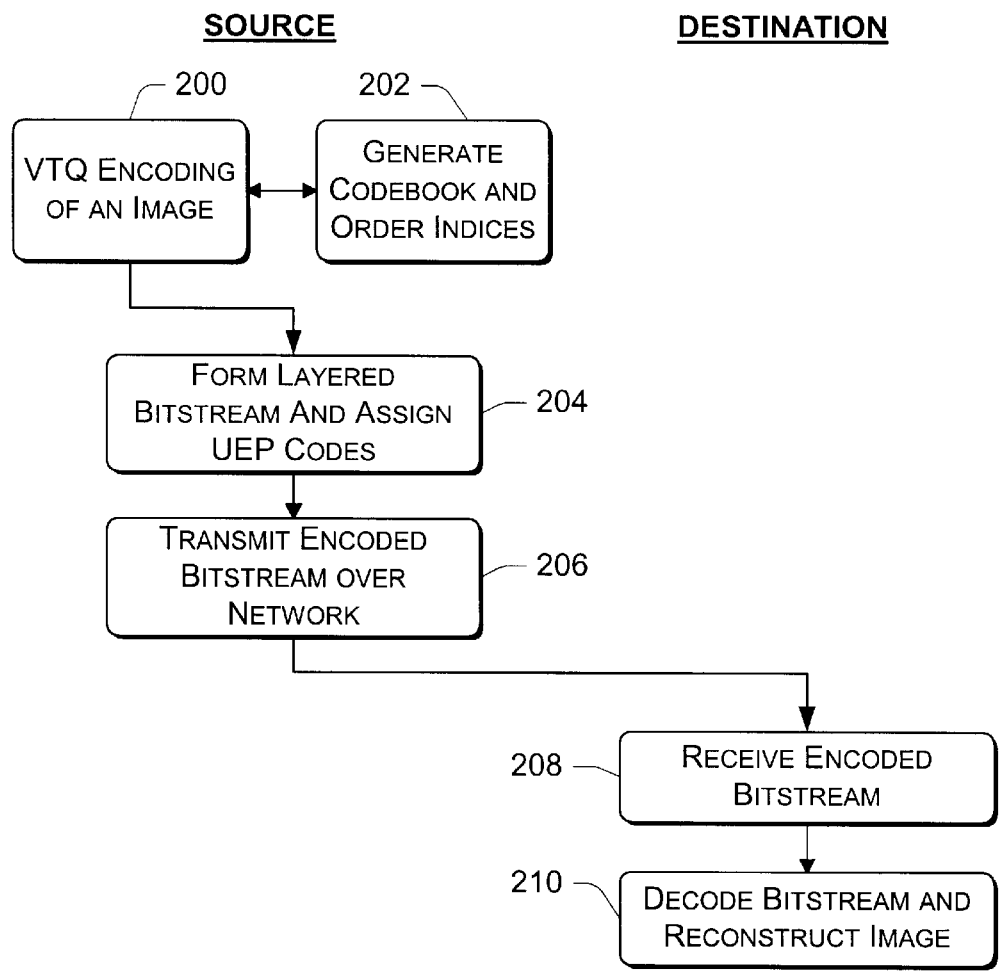
FIG. 2 is a flow diagram of a general method implemented by the distribution system of FIG. 1.

FIG. 2 shows a general image encoding and decoding process implemented by the architecture 20 in FIG. 1. The process is described generally here, and certain steps are described below in more detail.

At step 200, the encoder 40 at source 22 processes an image using some form of vector transformation followed by vector quantization (i.e., VTQ). Essentially, with VTQ processing, a source image is transformed into vectors using a vector transform, and the vectors are subsequently quantized using vector-based quantization. The result is quantized values that can be coded into a compressed bitstream. VTQ is well known and described in greater detail in Weiping Li and Ya-Qin Zhang, "Vector-Based Signal Processing and Quantization for Image and Video Compression", Proceedings of the IEEE, Vol. 83, No. 2, February 1995. One exemplary VTQ process is described below in more detail with reference to FIGS. 3–6.

In addition to the conventional VTQ processing, the encoder employs an ordered codebook 56 that is generated by codebook generator/orderer 54 (step 202). The codebook contains vectors and corresponding binary indexes that are ordered to minimize the potential for small errors in the indices to cause significant errors during decoding and recovery of the image. One exemplary codebook generation and ordering process is described below in more detail with reference to FIGS. 7–9.

Usually not all the parts in encoded bitstream are equally important or sensitive to channel noise over the network 24. For example, the MSB (most significant bit) of a quantized scalar is much more sensitive to error in comparison to less significant bits of the same scalar since an erroneous MSB will result in more distortion than any other erroneous bit.

Hence, at step 204, the image encoder 40 (via layering component 58) encodes the bitstream as a layered bitstream and assigns more or less error protection to the different layers depending upon their significance. This is the strategy behind unequal error protection (UEP). In essence, one source is divided into several sub-sources with different error sensitivity, and more error protection is provided to the more important sub-sources and less error protection is provided to the less important sub-sources. One exemplary layering and UEP process to layers the vector indexes created by the VTQ processing of step 200. The layered indexes are ascribed varying error protection using either a bit-plane based UEP scheme or a frequency based UEP. The layers may also be assigned a channel code. One exemplary layering and UEP process is described below in more detail with reference to FIG. 10.

At step 206, the source 22 transmits the encoded bitstream over the error-prone network. The UEP encoded bitstream includes the quantized image values, a bit allocation map used during quantization, and the layered vector indexes. One exemplary structure of the layered bitstream output by the source 22 is discussed below in more detail with reference to FIG. 11.

At step 208, the destination 26 receives the encoded bitstream. The decoder 70 at destination 26 decodes the bitstream and reconstructs the image (step 210). The decoder 70 decodes the vectors from the vector indexes and bit allocation map, and then reconstructs the image from the vectors and quantized image values. Hopefully, due to the error protection scheme, the destination receives sufficient data from the transmission to reconstruct at least a minimally satisfactory image. The decoding and reconstructing process is explained below in more detail with reference to FIG. 12.

Step 200: VT0 Coding

Figure 3:
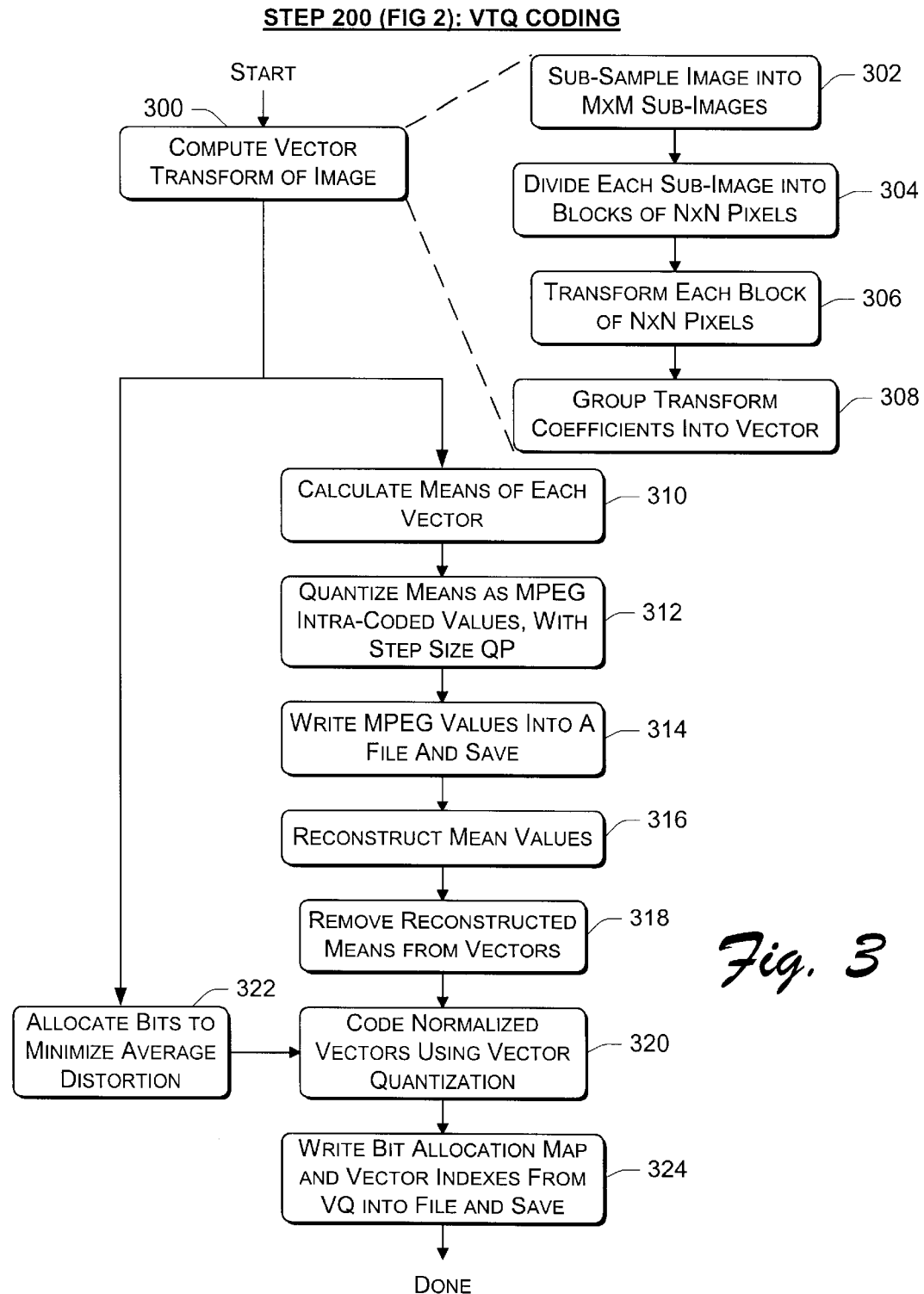
FIG. 3 is a flow diagram showing a step from the FIG. 2 method in more detail. The method illustrated in FIG. 3 pertains to processing an image using vector transformation followed by vector quantization.

FIG. 3 illustrates an exemplary VTQ coding process to code an image in step 200 of FIG. 2. The process is performed by encoder 40 at source 22, and more particularly, by VTQ coder 42. The steps may be performed in software, hardware, or a combination of software and hardware.

At step 300, the VTQ coder 42 computes a vector transform of an image. There are many kinds of vector transforms. One suitable transform is a two-dimensional vector transform, illustrated by steps 302–308. At step 302, an image is first sub-sampled into M×M sub-images.

Figure 4:
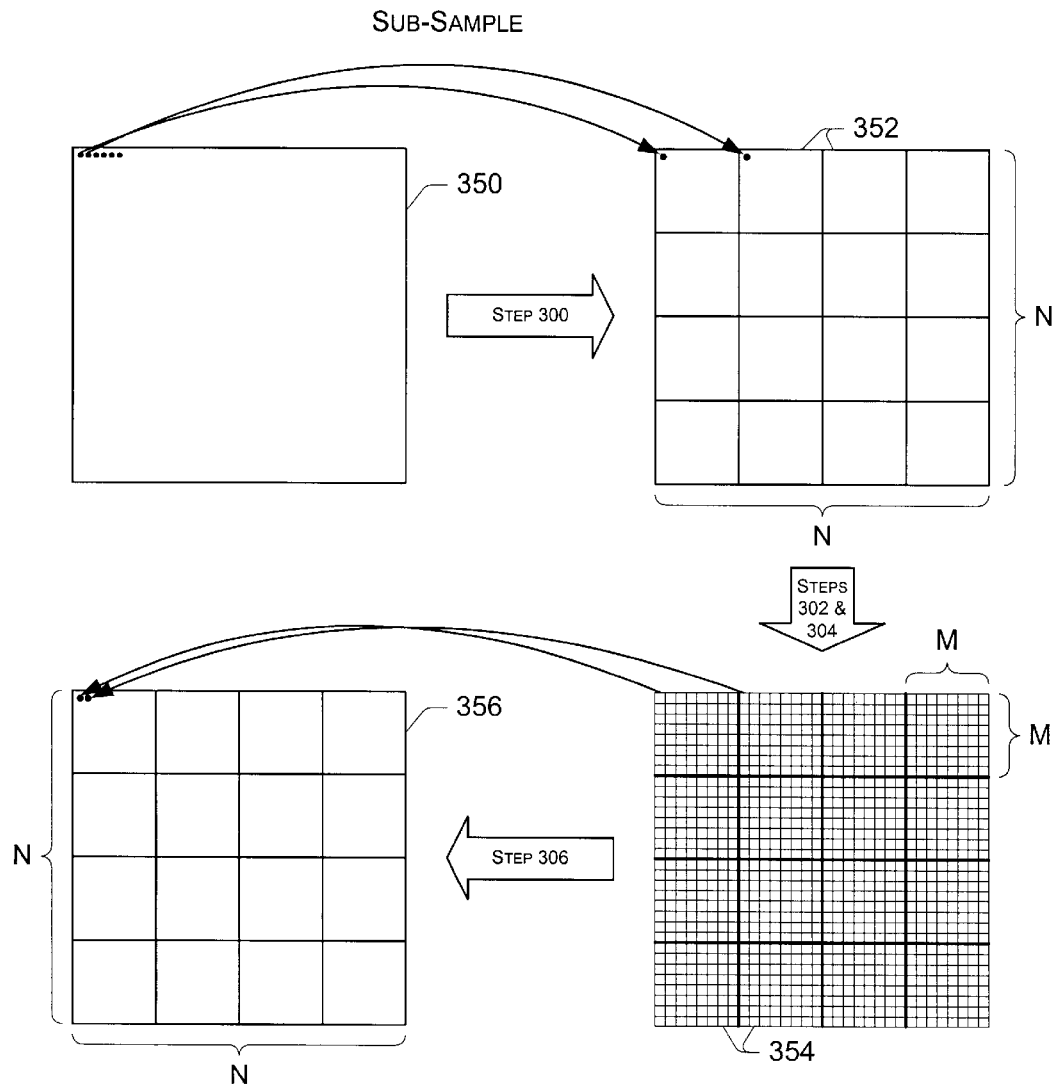
FIG. 4 is a diagrammatic illustration of an exemplary vector transform that may be utilized in the method of FIG. 3.

FIG. 4 illustrates an original image 350 that is sub-sampled into 4×4 sub-images 352 (i.e., M=4). The sub-sampling selects pixels from regions of the original image 350 to form the sixteen reduced-size sub-images 352. At step 304 in FIG. 3, each sub-image is divided into blocks of N×N pixels. Each block of N×N pixels is then transformed using a two-dimensional transform, such as Discrete Cosine Transform (DCT) or Discrete Wavelet Transform (DWT) (step 306). Steps 304 and 306 are illustrated in FIG. 4, where each sub-image 352 is divided into blocks of 8×8 pixels 354 (i.e., N=8) and transformed using two-dimensional DCT.

The transformation produces a set of coefficients. At step 308 in FIG. 3, the corresponding coefficients of the M×M sub-images are grouped into vectors of dimension M×M. This is illustrated in FIG. 4 by regrouping the M×M sub-images into M×M vectors 356. Each vector is composed of DCT coefficients having the same two-dimensional frequency. As a result, all vectors can be divided into 64 groups, each of which contains all vectors having the same frequency.

The vector transform possesses optimal vector quantization attributes. First, there is little inter-vector correlation. The pixels in the sub-sampled images are less correlated than pixels in the original image, and the two-dimensional DCT further reduces the inter-vector correlation. Secondly, the intra-vector correlation of the corresponding DCT coefficients is very high because the M×M sub-images are highly correlated with each other.

With continuing reference to FIG. 3, after computing the vector transform, the VTQ coder 42 calculates the mean of every vector 356 (step 310). Each mean is then quantized as MPEG intra-coded values, with a step size of some quantization scale, say, "QP" (step 312). The VTQ coder 42 writes the resultant MPEG image values to a file stored in memory for later inclusion in the bitstream (step 314).

At steps 316 and 318, the mean values are reconstructed using inverse quantization and then removed from the vectors to normalize the vectors. The mean-removed vectors have mean values near zero. The normalized vectors are quantized using a vectot-based quantization (VQ) (step 320).

At step 322, bits are allocated to various groups of vectors produced by the vector transform of step 300. The vectors might be grouped, for example, according to their frequency components so that one group contains DC vectors, another group is made up of low frequency vectors, and so forth. In the exemplary implementation, there are 64 (i.e., 8×8) groups of vectors, each with different statistics. As a result, different numbers of bits are allocated to different groups of vectors.

Figure 5:
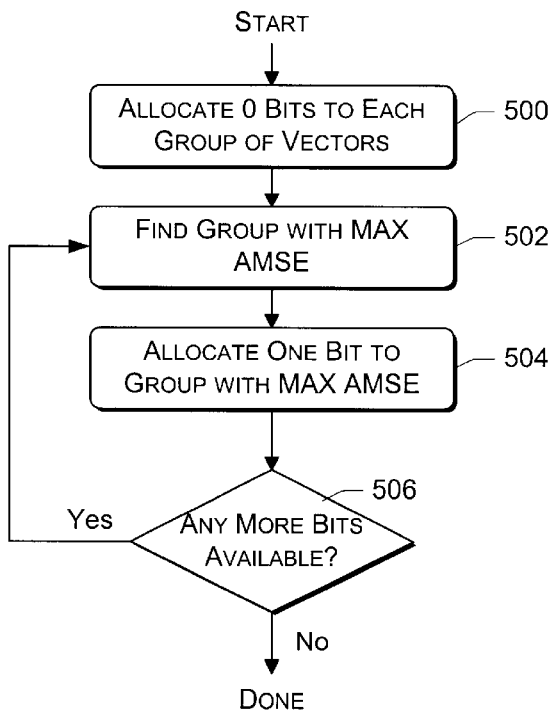
FIG. 5 is a flow diagram of a method for allocating bits during one part of the image processing method of FIG. 3.

FIG. 5 illustrates the steps of one suitable bit allocation process that attempts to minimize the average distortion of all vectors. The process iteratively assigns bits to different groups of vectors depending upon the maximum AMSE (Average Mean Squared Error). At step 500, no bits are initially allocated to each group of vectors. The process then determines the group of vectors with the maximum AMSE and allocates a bit for that group (steps 502 and 504). The process continues until all bits have been assigned (step 506).

Figure 6:
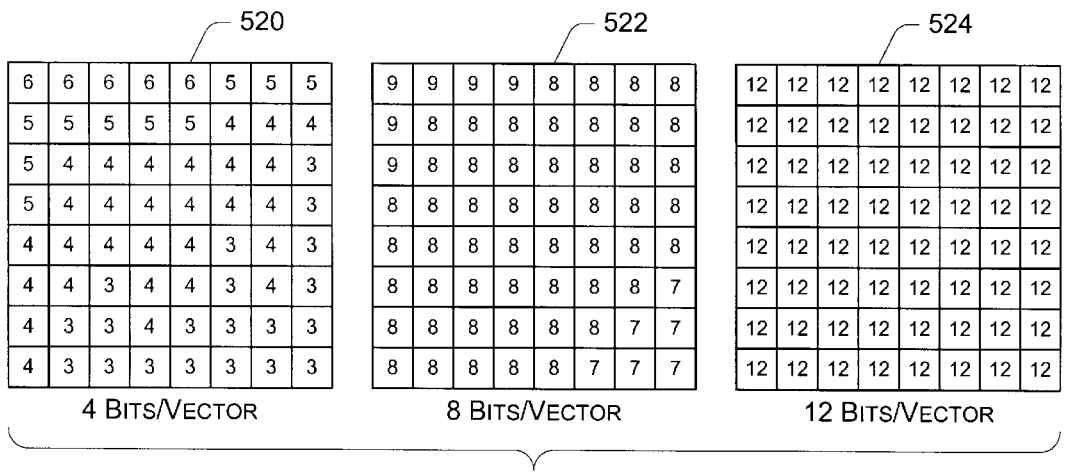
FIG. 6 is a diagrammatic illustration of exemplary bit allocation maps used by the bit allocation method of FIG. 5.

FIG. 6 shows three different bit allocation maps for the 8×8 groups of vectors: 4 bits/vector map 520, 8 bits/vector map 522 and 12 bits/vector map 524. With the 4 bits/vector map 520, different groups of vectors are allocated with different numbers of bits. Certain vector groups are allocated six bits, whereas other vector groups are allocated three bits. This results in a spread of three bits between the highest and lowest number of bits. As the number of available bits increases, a more uniform allocation is achieved. For the 8-bits/vector map 522, the spread is only two (i.e., 9 bits to 7 bits), and complete uniformity is achieved with the 12-bits/vector map 524 (i.e., all groups of vectors are allocated 12 bits).

The reason for a more uniform bit allocation is due to the non-uniform quantization of the MPEG intra blocks and the limitation of actual codebook size. MPEG uses a quantization matrix to quantize the mean values, with finer quantization for lower frequency coefficients and coarser quantization for higher frequency coefficients. This makes the mean-removed vectors more uniformly distributed compared with original vectors. Due to the real implementation limit, the actual codebook size has limit. After the maximum bit-rate of a codebook corresponding to a group of vector is reached, no more bits can be allocated to that group of vectors to reduce the AMSE. Thus, bits will be allocated to the group of vectors whose maximum codebook bit rate is not reached and who have the maximum AMSE With reference again to FIG. 3, the final step 324 in the VTQ coding process is to write the bit allocation map used by step 322 and layered vector indexes (described below in more detail with reference to detailed steps 202 and 204) into a file and save it to memory. The final bitstream produced by the source 22 includes the bit allocation map, layered vector indexes, MPEG intracoded values saved at step 314.

Step 202: Codebook Generation and Ordering

Figure 7:
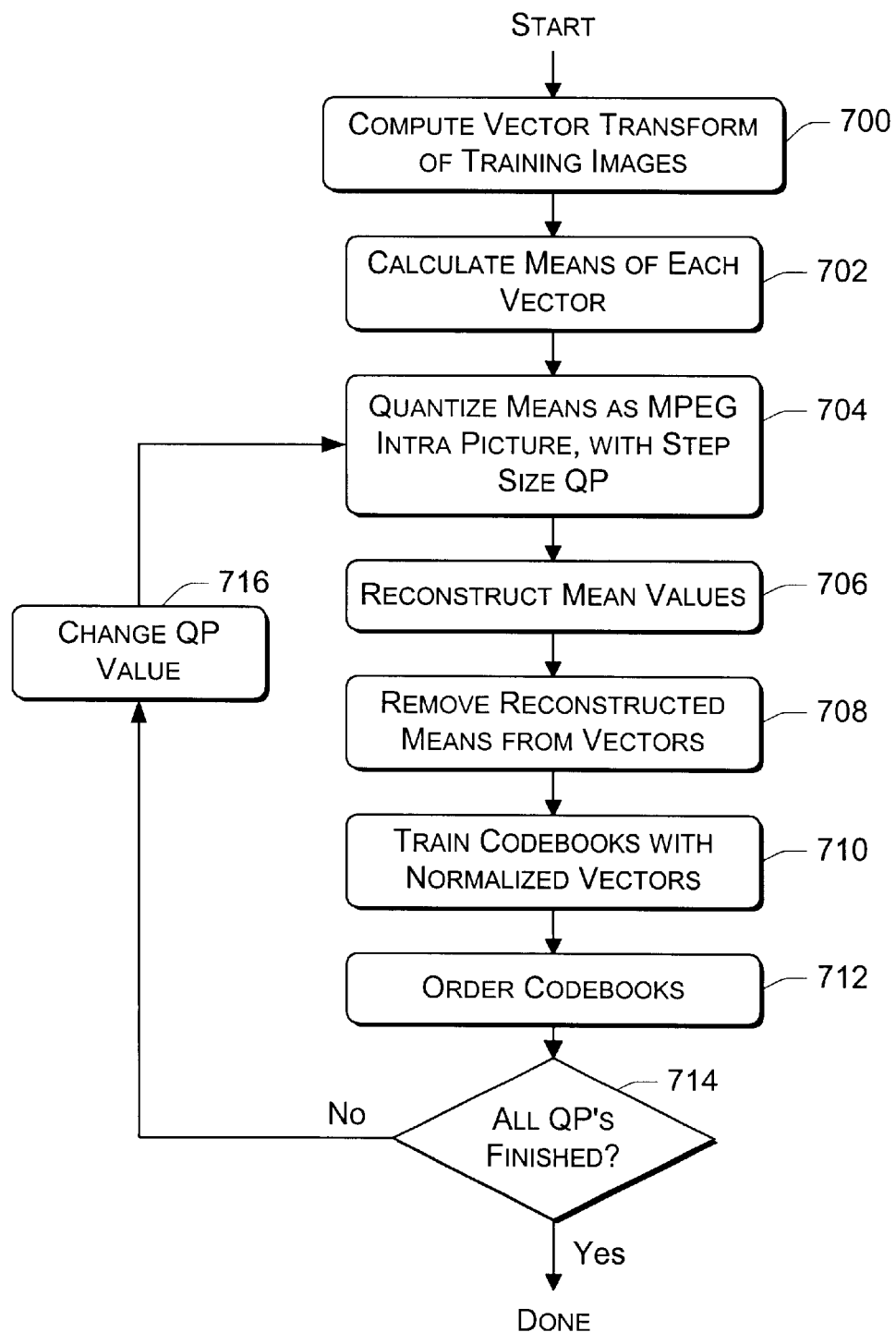
FIG. 7 is a flow diagram showing another step from the FIG. 2 method in more detail. The method illustrated in FIG. 7 pertains to generating and ordering a vector codebook and may be implemented at the source in the image distribution system of FIG. 1.

FIG. 7 illustrates an exemplary process for generating and ordering a codebook used in the VTQ encoding, depicted as step 202 in FIG. 2. The VTQ coder 42 at source 22 performs the process. In this exemplary implementation, the codebook is initially generated by the widely used LBG algorithm, which is described in Y. Linde, A. Buzo, and R. M. Gray, "An Algorithm for Vector Quantizer Design," IEEE Trans. Commun., vol. COM-28, pp. 84–95, January 1980.

More specifically, at step 700, the VTQ coder 42 performs vector transformation on many diverse training images (e.g., 15–20 images). Preferably, the VTQ coder employs the same vector transformation as described above with reference to FIGS. 3 and 4. Next, the VTQ coder 42 calculates the means of each vector produced by the transform (step 702). The means is quantized as an MPEG intra-coded values, with a step size of QP (step 704). At steps 706 and 708, the mean values are reconstructed and removed from the vectors to normalize the vectors. The codebooks are trained using the normalized vectors (step 710). Each vector has 16 elements with the same 2-D frequency generated by the 64 (i.e., 8×8) 2-D DCT coefficients. As a result, 64 codebooks are generated, each of which is for vectors having the same 2-D frequency.

Each code vector is assigned a binary index to represent it. Initially, each codebook generated by the LBG algorithm is not "well-ordered". "Well-ordered" means that the code vectors are placed in such a manner that a bit error occurring at a less significant bit in the binary index results in less distortion than a bit error at a more significant bit in the binary index. The order produced by the LBG algorithm leaves essentially random points in space, which depending upon the arrangement, may result in the unwanted situation where a one-bit error between sequential indices in the codebook introduces a significant error in the coded bitstream.

To minimize the potential for such error, the codebook orderer 54 reorders the indices in an order that minimizes the distance between vectors so that one-bit errors in the corresponding vector indexes cause minimal problems in the coded bitstream (step 712).

One sorting process starts from the code vector with the minimum distance from the origin. This vector is assigned the first binary index. From that vector, the nearest neighbor is found and assigned to the second binary index. The third binary index is assigned to the nearest neighbor of the second code vector, and so forth. This procedure continues until all code vectors in the codebook are assigned binary indexes.

Figure 8:
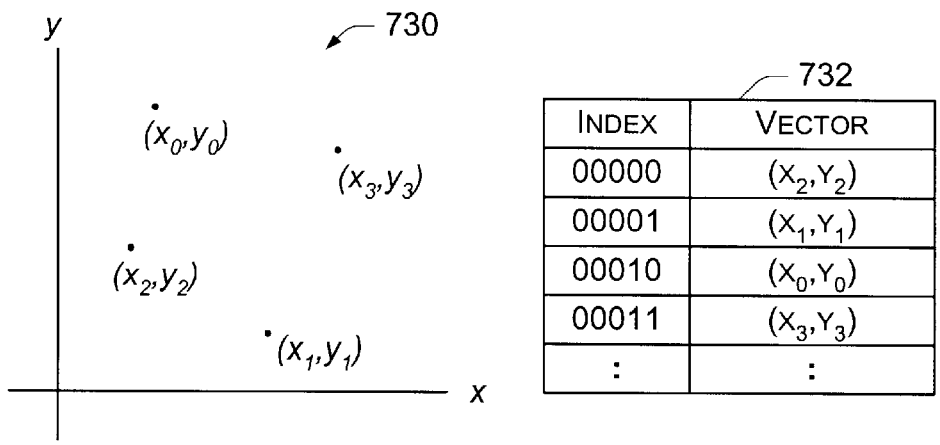
FIGS. 8 and 9 are diagrammatic illustrations of exemplary codebooks in a pre-ordered state (FIG. 8) and a post-ordered state (FIG. 9).
Figure 9:
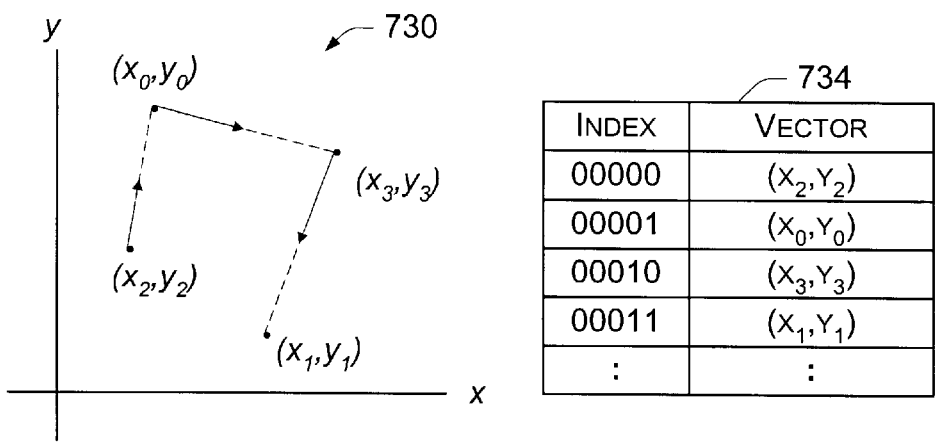

FIGS. 8 and 9 illustrate the sorting process. Suppose that the codebook contains four vectors in a two dimensional space, represented as $(x_0, y_0)$, $(x_1, y_1)$, $(x_2, y_2)$, and $(x_3, y_3)$. In reality, the codebook has many more vectors (e.g., 64), but only four are shown to demonstrate the sorting procedure. FIG. 8 shows a two-dimensional space 730 having four randomly distributed vector points, and a corresponding codebook 732. Without sorting, the vectors are randomly distributed in the codebook space. Here, vector $(X_2, Y_2)$ is closest, followed in order by $(X_1, Y_1)$, $(X_0, Y_0)$, and $(X_3, Y_3)$. Five-bit indices are then randomly assigned to the 64 code vectors, as represented by the first four indexes in the codebook 732.

FIG. 9 shows the two-dimensional space 730, and an ordered codebook 734 that is reordered following codebook generation. The ordering process begins with the code vector located closest to the origin, which is vector $(X_2, Y_2)$. This vector is listed first in the codebook 734 and assigned a first index "00000". The nearest neighbor is vector $(X_0, Y_0)$, which is listed next in the codebook 734 and assigned the next index "00001". The nearest neighbor to vector $(X_0, Y_0)$ is vector $(X_3, Y_3)$, which is listed next in the codebook and assigned index "00010". The nearest neighbor to vector $(X_3, Y_3)$ is vector $(X_1, Y_1)$, which is listed next in the codebook and assigned index "00011".

With reference again to FIG. 7, the codebook generation and ordering process continues until all steps of QP has been considered (steps 714 and 716).

Step 204: Bitstream Layering and UEP

The image distribution system of FIG. 1 employs an unequal error protection (UEP) scheme to protect different portions of the coded bitstream with different levels of protection. Two possible ways to implement the UEP scheme are (1) bit-plane based UEP and (2) frequency-based UEP. Generally, in bit-plane based UEP, the plane encompassing the MSB of the binary indices is deemed of highest importance in comparison to other planes, and hence receives the greatest protection. In frequency-based UEP, the DC vector and lower frequency vectors are deemed more important and are protected at the expense of higher frequency vectors. These two UEP strategies are discussed separately below.

Bit-Plane Based UEP

The ordered codebook 56 produced by step 202 (FIG. 2) contains multiple binary indexes assigned to corresponding vectors. The indexes contain bits with different significance. Like scalar values, the MSB has the most significance, the next most significant bit has less significant, and so on, with the least significant bit (LSB) having the least significance. The layering component 58 layers the vector indexes of the coded bitstream by bit planes according to their significance. That is, one plane contains the MSBs of the vector indexes, a second plane contains the next MSBs of the vector indexes, and so on.

The number of bits used to represent each group of vectors is derived from the bit allocation process of FIG. 5. DC vectors typically require the most bits, with progressively fewer bits being allocated to frequency vectors starting with the low frequency vectors onto the high frequency vectors. This is because DC and low frequency coefficients tend to be harder to code than high frequency coefficients. Accordingly, when coding the bit planes, the highest bit-plane contains DC vector indexes only or DC vector indexes plus a few low-frequency AC vector indexes. The next highest bit-plane contains AC vectors having a little higher frequency that were not contained in the highest bit-plane.

Figure 10:
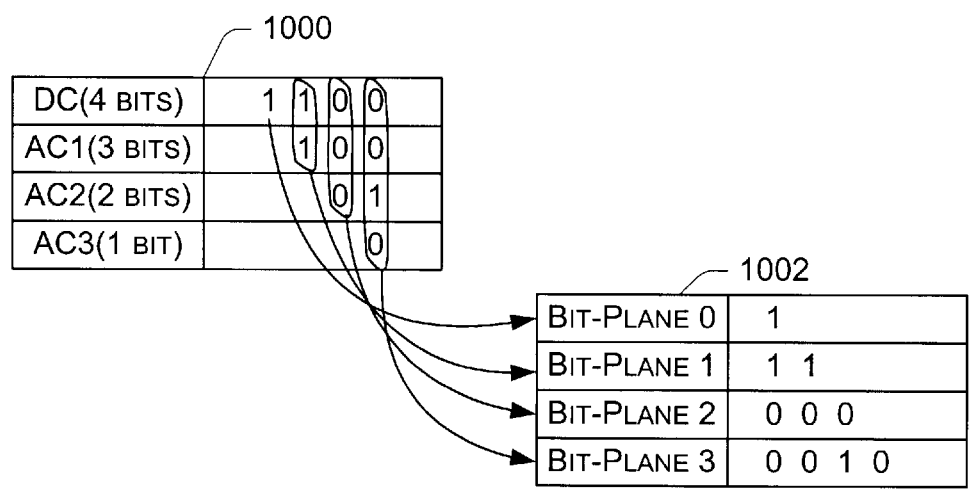
FIG. 10 is a diagrammatic illustration of a bit-plane layering scheme used by the source in the image distribution system of FIG. 1.

FIG. 10 illustrates a bit-plane layering scheme in which four vectors (DC, AC1, AC2, and AC3) are allocated correspondingly fewer bits, as shown by table 1000. These vectors are converted into four bit planes with increasingly more bits, as shown by table 1002. Here, the highest bit plane 0 contains the most significance because it contains the MSB of the DC vector. As mentioned in the bit allocation section, mean-removed vectors tend to have uniform bit assignment. However, this does not alter the fact that higher bit-planes show more significance.

The bit-plane layers are encoded into the bitstream in order, starting with the highest significant bit-plane down to the least significant bit-plane. In one implementation, with each bit-plane, the bits of vector indexes are put into the bitstream in a ZIG_ZAG_SCAN order, as used in MPEG coding.

After the bit planes are formed by the layering scheme and placed in the bitstream, the UEP coder 44 assigns different codes to different bit-planes to reflect their importance. In this example, bit-plane 0 is assigned the highest significance level, bit-plane 1 is assigned a lower significance level, and so on. In the context of RCPC, this means that bit-plane 0 is coded with the highest RCPC code rate, while the lowest bit-plane 3 is coded with the lowest RCPC code rate.

Even more specifically, the channel code assigned by the UEP coder 44 may be a concatenate of an outer CRC (Cyclic Redundancy Coder) code and an inner RCPC code. CRC has extremely low computational complexity and is used for error detection. The data in each layer is first partitioned into small bit blocks of size 256 bits. For each bit block, a 16-bit CRC checksum code and 4 zero refreshing bits (which means the number of memory of the convolutional code is 4) are added. This concatenate code is described in an article by H. Li, C. W. Chen, entitled "Bi-directional synchronization and hierarchical error correction for robust image transmission," SPIE Conf. Visual Communication and Image Processing '99, vol. SPIE 3653, (San Jose, Calif.), pp. 63–72, January, 1998.

Frequency-Based UEP

Frequency-based UEP is premised on the notion that low frequency coefficients have more impact on the visual quality of images than higher frequency coefficients. All DC vector indexes are layered as the first layer. The lowest AC vector indexes are layered as the second layer. This continues until the highest AC vector indexes are placed in a layer.

As with the bit-plane case, the layers are put into the bitstream in order, starting with the highest layer down to the least significant layer. The bits of vector indexes are put into the bitstream in a ZIG_ZAG_SCAN order, as used in MPEG coding. The UEP coder 44 assigns different codes to different frequency layers to reflect their importance. In this example, the layer with DC vector indexes is assigned the highest significance level (e.g., highest RCPC code rate), followed by the layer with the lowest AC vector indexes, and so on.

Exemplary Coded Bitstream Structure

The image encoder 40 outputs a bitstream that is layered to support an UEP scheme. The bitstream includes three components: (1) the MPEG intra-coded mean values computed during the VTQ processing of FIG. 3; (2) the bit allocation map used by the VTQ processing; and (3) the layers of vector indexes.

Figure 11:
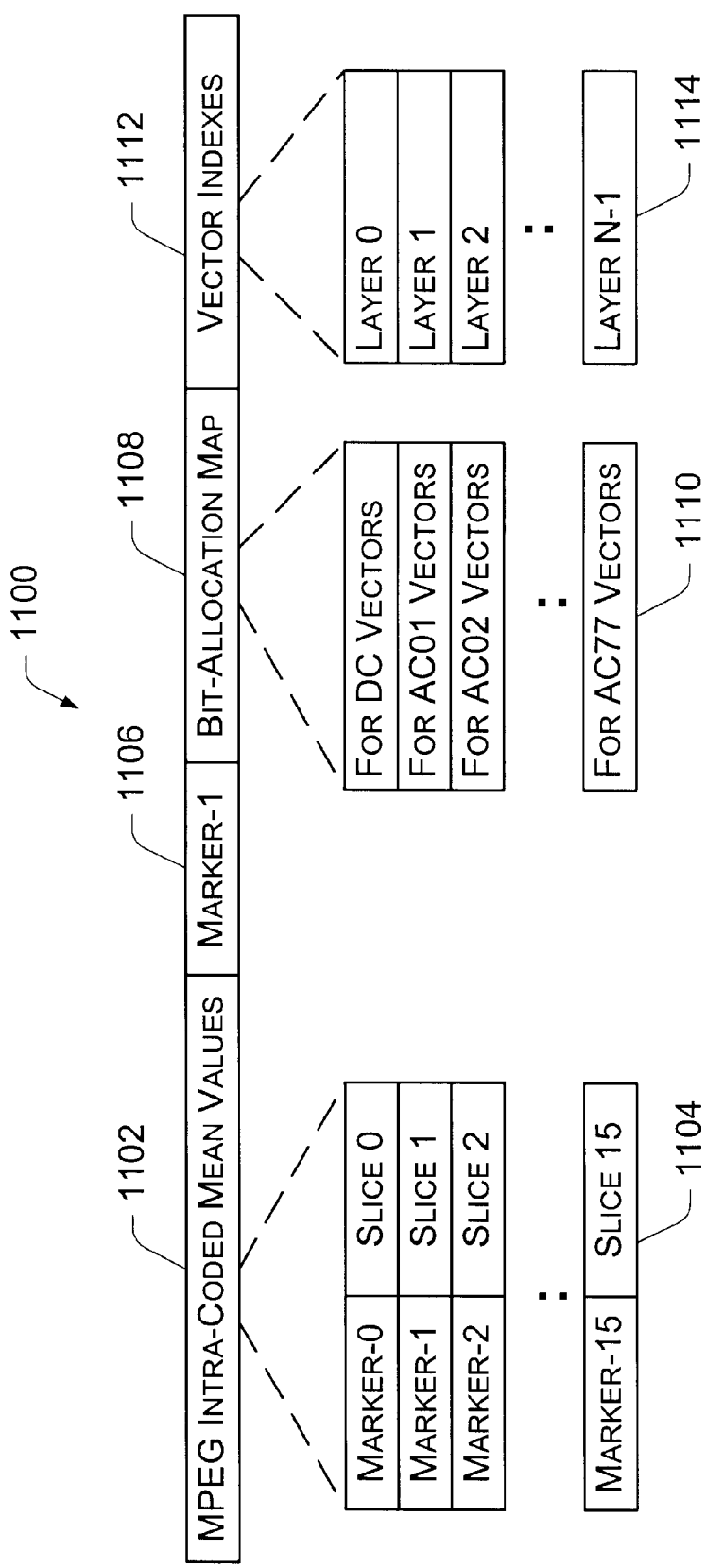
FIG. 11 is a diagrammatic illustration of a bitstream structure produced by the source and transferred to the destination of the image distribution system in FIG. 1.

FIG. 11 shows an exemplary structure 1100 of the bitstream generated by image encoder 40 of FIG. 1. The bitstream structure 1100 includes a field 1102 that holds the MPEG intra-coded mean values computed during the VTQ coding step 200 (FIGS. 1 and 3). The MPEG mean values field 1102 contains a list of sixteen marker/slice pairs 1104. The markers are equivalent to start codes as used in MPEG to identify the start of slices, One of the markers 1106 follows the mean values 1102 in the bitstream 1100. The markers also assist in resynchronization in case of bit errors. Each corresponding slice contains one row of N×N block coefficients produced during the vector transformation process.

A bit allocation map 1108 follows the marker 1106. The bit allocation map 1108 is used to allocate bits to various groups of vectors, as described in step 322 of FIG. 3 and more particularly, with reference to FIG. 5. The bit allocation map 1108 includes a listing of the bits allocated for each group of vectors 1110, including bits for DC vectors, bits for low frequency vectors (i.e., AC01 vectors), and so on. Each item in the bit allocation map is fixed to four bits.

The vector indexes 1112 are appended to the bit-allocation map 1108 in the bitstream 1100. The vector indexes 1112 are coded into the bitstream as multiple layers 1114 according to their significance as determined, in the bitstream layering and UEP step 204 of FIG. 2. Each layer has a different meaning depending upon the layering scheme used, bit-plane based or frequency based.

The bitstream structure 1100 is advantageous because it contains not only the coded image components, but also the bit allocations for various groups of vectors and the layered indices used for unequal error protection.

Step 210: Bitstream Decoding and Image Reconstruction

Figure 12:
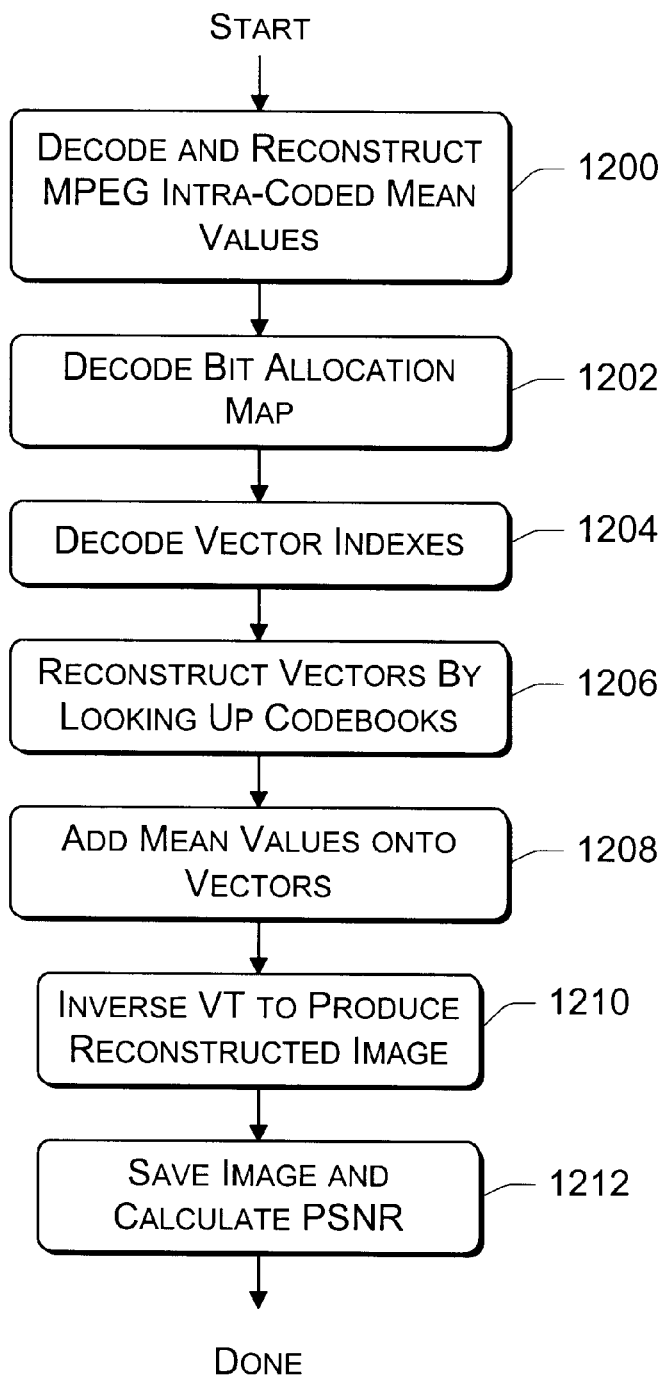
FIG. 12 is a flow diagram showing another step from the FIG. 2 method in more detail. The method illustrated in FIG. 12 pertains to decoding an image and may be implemented at the destination in the image distribution system of FIG. 1.

FIG. 12 illustrates an exemplary process for decoding the bitstream and reconstructing the image, which is shown as step 210 in FIG. 2. The decoder 70 at destination 26 performs the process.

At step 1200, decoder 70 decodes and reconstructs the MPEG intra-coded mean values 1102 from the bitstream 1100. The decoder 70 then decodes the bit allocation map 1108 and the vector indexes from the bitstream 1100 (steps 1202 and 1204). The decoder 70 uses the vector indexes to index the ordered codebook and reconstruct the corresponding vectors (step 1206). The vectors are allocated the number of bits stipulated by the bit allocation map.

At step 1208, the decoder 70 adds the mean values 1102 back onto the vectors to recapture essentially the original vectors produced from the source image. The vectors are then passed through an inverse vector transform to reconstruct the image (step 1210). The image is then saved to memory at the destination (step 1212).

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method comprising:

processing an image using a vector transformation to produce vectors representing the image; and ordering the vectors in codebooks and assigning vector indexes to the vectors such that a bit error occurring at a less significant bit in a vector index results in less distortion than a bit error occurring at a more significant bit in the vector index.

2. A method as recited in claim 1, wherein the processing comprises performing vector transformation followed by vector quantization.

3. A method as recited in claim 1, wherein the vector transformation comprises:

sub-sampling the image into sub-images;

dividing each of the sub-images into blocks of pixels;

transforming each of the blocks of pixels to produce coefficients; and regrouping the coefficients of the sub-images into one or more vectors.

4. A method as recited in claim 1, wherein the ordering of codebooks comprises:

(a) selecting an initial vector;

(b) assigning a vector index to the initial vector;

(c) selecting a next vector that is nearest to the vector last assigned a vector index;

(d) assigning a next vector index to the next vector; and (e) repeating the (c) selecting and the (d) assigning for all of the vectors.

5. A method as recited in claim 1, further comprising forming a codebook containing the vectors and corresponding vector indexes.

6. A method as recited in claim 1, further comprising forming a bitstream containing information regarding the image and the vector indexes.

7. A method as recited in claim 6, further comprising applying unequal error protection to various parts of the bitstream.

8. A computer-readable medium comprising computer executable instructions that, when executed, direct a computing device to perform the method as recited in claim 1.

9. A method comprising:

transforming an image into multiple vectors;

generating a codebook that contains the vectors and corresponding vector indexes that reference the vectors, the codebook arranging the vectors such that a bit error occurring at a less significant bit in a vector index results in less distortion than a bit error occurring at a more significant bit;

allocating bits to various groups of the vectors according to a bit allocation map;

quantizing the vectors to produce quantized values representative of the image;

layering the vector indexes into multiple layers according to significance; and forming a bitstream having the quantized values, the bit allocation map, and the layers of vector indexes.

10. A method as recited in claim 9, wherein the transforming comprises:

sub-sampling the image into sub-images;

dividing each of the sub-images into blocks of pixels;

transforming each of the blocks of pixels to produce coefficients; and regrouping the coefficients of the sub-images into one or more vectors.

11. A method as recited in claim 9, wherein the generating comprises:

(a) storing an initial vector in the codebook;

(b) assigning a vector index to the initial vector;

(c) selecting a next vector that is nearest to the vector last assigned a vector index;

(d) storing the next vector in the codebook;

(e) assigning a next vector index to the next vector; and (f) repeating the (c) selecting, the (d) storing, and the (e) assigning for all of the vectors.

12. A method as recited in claim 9, wherein the quantizing comprises computing MPEG intra-coded means values.

13. A method as recited in claim 9, wherein the layering comprises:

forming bit-plane layers from the vector indexes; and encoding the bit-plane layers into the bitstream in order of significance.

14. A method as recited in claim 9, wherein the layering comprises:

forming frequency-based layers from the vector indexes; and encoding the frequency-based layers into the bitstream in order of significance.

15. A method as recited in claim 9, further comprising assigning different channel codes to different layers.

16. A computer-readable medium comprising computer executable instructions that, when executed, direct a computing device to perform the method as recited in claim 9.

17. A method comprising:
   transforming an image into multiple vectors;
   quantizing the vectors to produce image values;
   ordering the vectors in codebooks and assigning vector indexes to the vectors such that a bit error occurring at a less significant bit in a vector index results in less distortion than a bit error occurring at a more significant bit;
   transmitting the image values and the vector indexes over a communication channel;
   receiving the image values and the vector indexes from the communication channel;
   recovering the vectors using the vector indexes; and
   reconstructing the image from the image values and the vectors.

18. A method as recited in claim 17, wherein the transforming comprises:
   sub-sampling the image into sub-images;
   dividing each of the sub-images into blocks of pixels;
   transforming each of the blocks of pixels to produce coefficients; and
   regrouping the coefficients of the sub-images into one or more vectors.

19. A method as recited in claim 17, wherein the quantizing comprises computing MPEG intra-coded means values.

20. A method as recited in claim 17, wherein the ordering of codebooks comprises:
   (a) selecting an initial vector;
   (b) assigning a vector index to the initial vector;
   (c) selecting a next vector that is nearest to the vector last assigned a vector index;
   (d) assigning a next vector index to the next vector; and
   (e) repeating the (c) selecting and the (d) assigning for all of the vectors.

21. A method as recited in claim 17, further comprising layering the vector indexes into multiple layers according to significance.

22. A method as recited in claim 21, wherein the layering comprises:
   forming bit-plane layers from the vector indexes; and
   encoding the bit-plane layers into the bitstream in order of significance.

23. A method as recited in claim 21, wherein the layering comprises:
   forming frequency-based layers from the vector indexes; and
   encoding the frequency-based layers into the bitstream in order of significance.

24. A method as recited in claim 21, further comprising assigning different channel codes to different layers.

25. A computer-readable medium comprising computer executable instructions that, when executed, direct a computing device to perform the method as recited in claim 17.

26. An image encoder, comprising:
   a vector transform component to transform an image into multiple vectors;
   a vector quantization component to quantize the vectors to produce image values;
   a codebook generator to generate an ordered codebook that contains the vectors and corresponding vector indexes that reference the vectors, the ordered codebook arranging the vectors such that a bit error occurring at a less significant bit in a vector index results in less distortion than a bit error occurring at a more significant bit; and
   an error protection module to layer the vector indexes into multiple layers according to significance and to apply different levels of error protection to different layers.

27. An image encoder as recited in claim 26, wherein the vector transform component is configured to sub-sample the image into sub-images, divide each of the sub-images into blocks of pixels, transform each of the blocks of pixels to produce coefficients, and regroup the coefficients of the sub-images into one or more vectors.

28. An image encoder as recited in claim 26, wherein the codebook generator organizes the codebook by ordering the vectors such that a next vector is nearest to a previous vector and assigning monotonically changing vector indexes to the vectors.

29. An image encoder as recited in claim 26, wherein the error protection module forms bit-plane layers from the vector indexes and encodes the bit-plane layers into a bitstream in order of significance.

30. An image encoder as recited in claim 26, wherein the error protection module forms frequency-based layers from the vector indexes and encodes the frequency-based layers into a bitstream in order of significance.

31. An image encoder as recited in claim 26, wherein the error protection module assigns different channel codes to the different layers.

32. An image coding system, comprising:
   means for processing an image using a vector transformation to produce vectors representing the image; and
   means for ordering the vectors and assigning vector indexes to the vectors such that a bit error occurring at a less significant bit in a vector index results in less distortion than a bit error occurring at a more significant bit.

33. An image coding system as recited in claim 32, wherein the means for processing comprises:
   means for sub-sampling the image into sub-images;
   means for dividing each of the sub-images into blocks of pixels;
   means for transforming each of the blocks of pixels to produce coefficients; and
   means for regrouping the coefficients of the sub-images into one or more vectors.

34. An image coding system as recited in claim 32, wherein the means for ordering comprises:
   means for arranging the vectors such that a next vector is nearest to a previous vector; and
   means for assigning monotonically changing vector indexes to the vectors.

35. An image coding system as recited in claim 32, further comprising means for forming an ordered codebook containing the vectors and corresponding vector indexes.

36. An image coding system as recited in claim 32, further comprising means for forming a bitstream containing information regarding the image and the vector indexes.

37. An image coding system as recited in claim 36, further comprising means for applying unequal error protection to various parts of the bitstream.

38. A computer-readable medium having computer-executable instructions that, when executed, direct a computing device to:
   process an image using a vector transformation to produce vectors representing the image;

quantize the vectors to produce image values; and order the vectors in codebooks and assigning vector indexes to the vectors such that a bit error occurring at a less significant bit in a vector index results in less distortion than a bit error occurring at a more significant bit.

39. A computer-readable medium as recited in claim 38, further comprising computer-executable instructions that, when executed, direct a computing device to:

sub-sample the image into sub-images;

divide each of the sub-images into blocks of pixels;

transform each of the blocks of pixels to produce coefficients; and regroup the coefficients of the sub-images into one or more vectors.

40. A computer-readable medium as recited in claim 38, further comprising computer-executable instructions that, when executed, direct a computing device to allocate different numbers of bits to different groups of the vectors.

41. A computer-readable medium as recited in claim 38, further comprising computer-executable instructions that, when executed, direct a computing device to form a bitstream containing the image values and the vector indexes and to assign different levels of protection to different parts of the bitstream.

42. A computer-readable medium as recited in claim 38, further comprising computer-executable instructions that, when executed, direct a computing device to layer the vector indexes and assign different levels of protection to different layers.

* * * * *

UNITED STATES PATENT AND TRADEMARK OFFICE
CERTIFICATE OF CORRECTION

PATENT NO.    : 6,621,935 B1
DATED         : September 16, 2003
INVENTOR(S)   : Xin et al.

It is certified that error appears in the above-identified patent and that said Letters Patent is hereby corrected as shown below:

Column 1,
Line 30, replace "arc" with -- are --.

Column 6,
Line 32, replace "VT0" with -- VTQ --.

Column 7,
Line 15, replace "vectot-based" with -- vector-based --.

Signed and Sealed this

Thirteenth Day of January, 2004

JON W. DUDAS
*Acting Director of the United States Patent and Trademark Office*